UNITED STATES PATENT OFFICE.

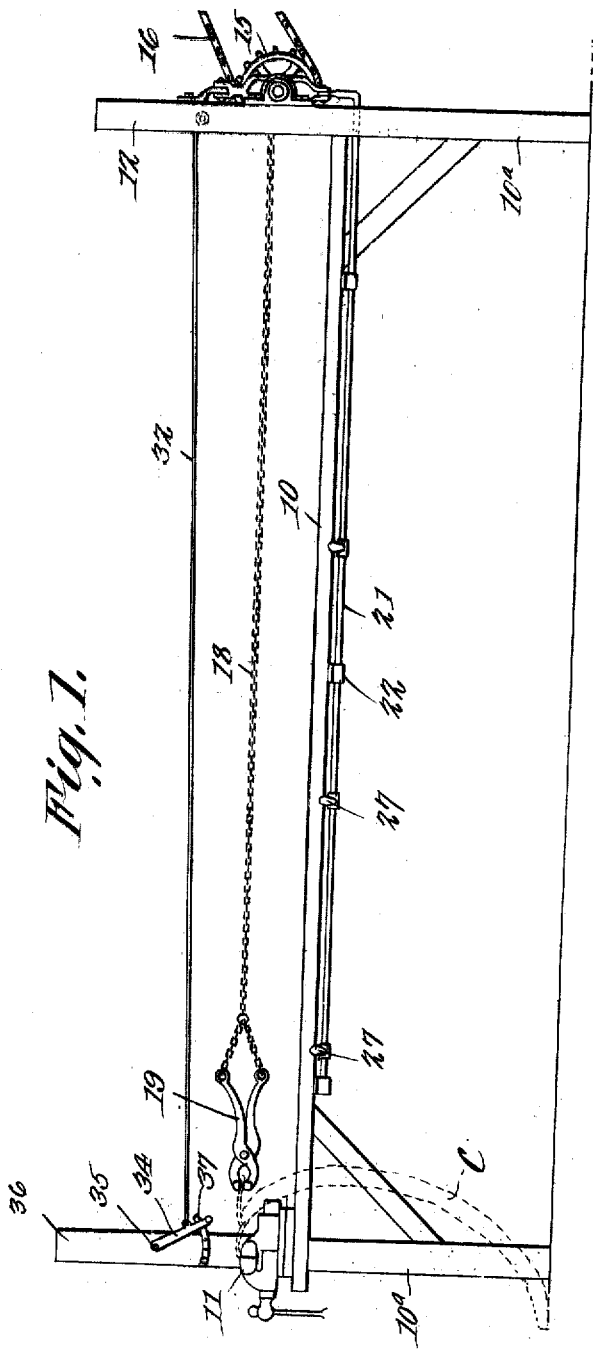
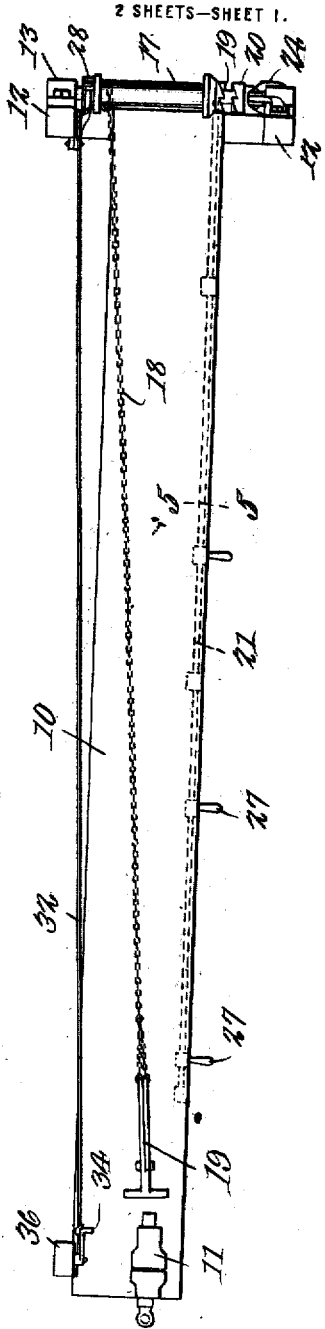

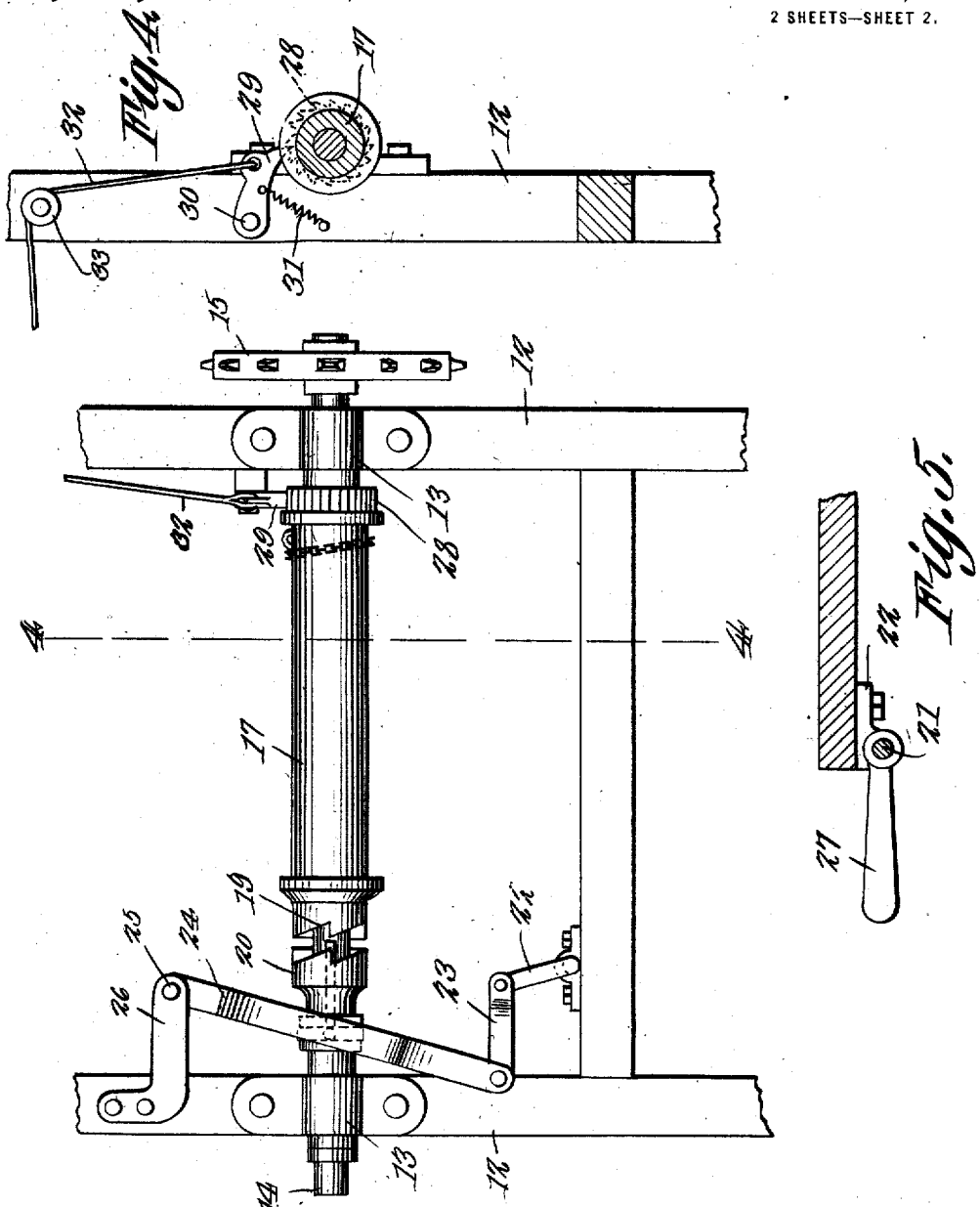

GIFFORD E. BLAYLOCK, OF BALTIMORE, MARYLAND.

TIRE-TREAD STRIPPER.

1,320,728.  Specification of Letters Patent.  Patented Nov. 4, 1919.

Application filed August 28, 1918. Serial No. 251,860.

*To all whom it may concern:*

Be it known that I, GIFFORD E. BLAYLOCK, a citizen of the United States, residing at Baltimore city, State of Maryland, have invented certain new and useful Improvements in Tire-Tread Strippers, of which the following is a specification.

The machine or appliance which is the subject-matter of the present application for patent is designed for stripping or removing the rubber tread from tire casings, and its object is to provide a simple and efficient means whereby this operation may be readily effected.

With the object stated in view, the invention consists in a novel combination and arrangement of parts to be hereinafter described and claimed; and in order that the same may be better understood, reference is had to the accompanying drawings forming a part of this specification.

The preferred embodiment of the invention has been disclosed, but it will be understood that various changes and modifications in the structural details may be made without a departure from the spirit and scope of the invention as claimed hereinafter.

In the drawings, Figure 1 is an elevation of the machine;

Fig. 2 is a plan view thereof;

Fig. 3 is an elevation of a winding drum and a clutch mechanism associated therewith;

Fig. 4 is a section on the line 4—4 of Fig. 3; and

Fig. 5 is an enlarged cross-section on the line 5—5 of Fig. 2.

Referring specifically to the drawings, 10 denotes the top of a work bench supported on legs 10ª and of such length as to provide a support for the tire casing to be operated on. On one end of the bench top is mounted a holder which may be an ordinary vise 11, or any other suitable gripping appliance. From the opposite end of the bench top rise standards 12 which carry bearings 13 supporting a transverse shaft 14 driven from any suitable power source (not shown). The shaft is shown equipped with a sprocket wheel 15 connected to the power source by a chain 16. It will be understood, of course, that any other suitable driving means may be employed.

On the shaft 14 is loosely mounted a drum 17 over which is wound a hauling line 18 to the outer end of which latter is fastened a gripping device in the form of a pair of tongs 19. One end of the drum 17 has a clutch member 19 which is opposite a cooperating clutch member 20, which latter is fast on the shaft 14 and is also slidable thereon so that it may be engaged with the clutch member 19 or be disengaged therefrom. When the clutch members are engaged and the shaft 14 is in motion, the drum 17 is rotated, and when the clutch members are disengaged, the drum remains stationary.

The clutch member 20 is controlled by a rock shaft 21 extending throughout substantially the entire length of the bench top 10 on one side thereof, and supported in bearings 22 on the bottom of the latter. The rock shaft 21 has a rocker arm 22' which is connected by a link 23 to one end of a clutch shifter lever 24 pivoted at its other end, as shown at 25, to a suitable bracket 26 carried by one of the standards 12. The shifter lever 24 is operatively connected intermediate its ends to the clutch member 20 in the ordinary manner. At suitable intervals, the rock shaft 21 is provided with actuating handles 27.

To prevent the hauling line 18 from unwinding from the drum 17 when the clutch member 20 is disengaged, the drum is fitted with a ratchet 28 which is engaged by a pawl 29 pivoted at 30 to one of the standards 12. A spring 31 connected to the pawl 29 yieldingly holds the same in engagement with the ratchet 28.

To the pawl 29 is connected a trip line 32 passing over a guide pulley 33 on the adjacent standard 12, from which guide pulley, the line passes to the forward end of the bench top 10, where it is connected to an operating lever 34 pivoted at 35 to a standard 36 rising from this end of the bench top. This standard also carries a guide sector 37 for the lever 34.

In operation, the tire casing shown dotted at C in Fig. 1, is cut through transversely, and one end is placed in the vise 11. Enough of the tread is then loosened from the fabric so that the tongs 19 may be engaged with the end of the tread as shown in Fig. 1. The clutch member 20 is now engaged with the clutch member 19, whereupon the drum 17 is set in motion and the line 18 is wound thereon, which draws the tongs 19 toward the rear end of the bench top 10, and as the tongs are gripping the tread, the latter is stripped off the fabric of the tire casing in an obvious manner. The operator stands at the edge of the work bench where the handles 27 are located and follows the tongs as they travel along the bench top, so that if the tread should start to stick to the fabric, he can at once stop the drum and bring the tongs to a rest. After loosening the sticking tread from the fabric by means of a suitable hand tool, the drum is again started to resume the stripping operation. The machine is therefore under complete control of the operator, and the stripping operation can be carried out without danger of injury to the fabric by any portion of the tread sticking thereto. When the drum is thrown out of gear as hereinbefore described, the pawl 29 prevents the same from turning backward, and when the stripping operation is completed, the pawl will be released to allow the line 18 to be unwound for bringing the tongs 19 to the front end of the work bench to grasp the tread of the next casing to be operated on.

I claim:

1. An appliance of the kind described, comprising a longitudinal support, a holder positioned at one end of the support, a gripper movable along the support toward and from the holder, clutch-controlled means for operating the gripper, and a clutch-controlling means positioned on one side of the support and extending in the direction of the length thereof.

2. An appliance of the kind described, comprising a longitudinal support, a holder positioned at one end of the support, a winding drum supported at the other end of the support, clutch-controlled means for operating the drum, a hauling line connected to the drum, a gripper carried by the hauling line, a rock shaft extending lengthwise of the support on one side thereof and having a plurality of actuating means, and a connection between the rock shaft and the clutch for controlling the latter.

In testimony whereof I affix my signature in the presence of two witnesses.

GIFFORD E. BLAYLOCK.

Witnesses:
E. WALTON BREWINGTON,
HOWARD D. ADAMS.